(12) United States Patent
Martin (10) Patent No.: US 8,706,317 B2
(45) Date of Patent: Apr. 22, 2014

(54) DATA PROCESSING METHOD FOR DETERMINING DRIFT VALUES OF AT LEAST ONE TIRE

(75) Inventor: Denis Martin, Clermont-Ferrand (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/394,441

(22) PCT Filed: Sep. 2, 2010

(86) PCT No.: PCT/EP2010/062889
§ 371 (c)(1),
(2), (4) Date: Apr. 10, 2012

(87) PCT Pub. No.: WO2011/029771
PCT Pub. Date: Mar. 17, 2011

(65) Prior Publication Data
US 2012/0191268 A1   Jul. 26, 2012

(30) Foreign Application Priority Data
Sep. 10, 2009   (FR) ...................................... 09 56218

(51) Int. Cl.
*B60T 8/172* (2006.01)
*G09B 9/058* (2006.01)
*G01S 19/41* (2010.01)

(52) U.S. Cl.
USPC ............... 701/1; 434/61; 342/357.31; 706/23

(58) Field of Classification Search
USPC ............... 701/1; 434/61; 342/357.31; 706/23
See application file for complete search history.

(56) References Cited

U.S. PATENT DOCUMENTS

| | | | |
|---|---|---|---|
| 4,880,043 A | 11/1989 | Decima et al. | |
| 6,954,175 B1 * | 10/2005 | Cox | 342/357.31 |
| 7,251,638 B2 * | 7/2007 | Fujii et al. | 706/23 |
| 2003/0059744 A1 * | 3/2003 | Tuluie et al. | 434/61 |

FOREIGN PATENT DOCUMENTS

EP   0 280 889 A1   9/1988

OTHER PUBLICATIONS

International Search Report (PCT/ISA/210) issued on Sep. 29, 2010, by French Patent Office as the International Searching Authority for International Application No. PCT/EP2010/062889.

* cited by examiner

Primary Examiner — Helal A Algahaim
Assistant Examiner — Yazan A Soofi
(74) Attorney, Agent, or Firm — Dickinson-Wright PLLC (57) ABSTRACT

A data processing method for determining the drift values of at least one tire comprising, for various positions of the vehicle on a track, determining coordinates of GPS antennas, determining values of roll of the vehicle, determining various points of contact between tire and track based on coordinates of at least one GPS antenna and based on various values of roll of the vehicle, said contact points defining a trajectory of the tire on the track; determining a tangent to the trajectory of the tire at at least one contact point, determining, based on coordinates of the GPS antenna, an orientation of a wheel plane associated with the tire, and determining a drift value based on the tangent and on the orientation of the wheel plane.

9 Claims, 5 Drawing Sheets

DATA PROCESSING METHOD FOR DETERMINING DRIFT VALUES OF AT LEAST ONE TIRE

The present invention relates to a data processing method for determining drift values of at least one tire of a vehicle.

The method of the invention finds applications especially in the automobile and/or motorbike sector.

In order to study the performance of a vehicle such as a motorbike, trials are generally undertaken on a track of a circuit. These trials make it possible to follow the evolution of a plurality of parameters associated with the vehicle with a view to analysing the behaviour of the said vehicle on the track. These parameters may for example be, the yaw rate of the vehicle, the braking loads applied, the play of a suspension, the temperature of the tires, the pressure of the tires, the angle of steer of the front wheel of the motorbike, etc.

A tire specialist technician can utilize these parameters to analyse the behaviour of the tires of the motorbike and solve the problems encountered by the driver (vibration, loss of grip, etc.).

With this aim, it is beneficial for the technician to analyse the evolution of a particular parameter, namely the drift of a tire of the vehicle.

A drift value corresponds to an angle formed between an orientation of a wheel plane associated with a tire and a tangent to the trajectory of the tire, at the level of a point of contact with the track.

The plane, tied to a wheel (and therefore tied to a tire), which is perpendicular to the axis of rotation of the wheel and which passes through the centre of an area of contact with the track when the wheel is vertical, that is to say perpendicular to the running plane of the track, is called the "wheel plane". The orientation of the wheel plane therefore varies like that of the wheel.

It will be noted henceforth that the drift of the front tire and the drift of the rear tire are not always identical. Indeed, when cornering, the driver regulates his/her action thereof so as to maintain his/her trajectory. The front tire of the motorbike is then caused to drift subsequent to the driver's steering action. The rear tire compensates for the loads which are applied to the vehicle (especially the centrifugal force) by also drifting. Overall equilibrium of the vehicle is then regained during cornering by the drifting of the front tire and of the rear tire.

The technician wishes to utilize various drift values of the front and/or rear tire at various positions of the vehicle on the track.

A method for determining drift values that is known from the prior art consists in using a measurement device with local-frequency filtering operating according to the principle of optical correlation.

This measurement device operates in a limited span of values of roll of the vehicle (plus or minus 8 degrees) which does not render it suitable for vehicles of motorbike type whose roll value when cornering may be greater than 30 degrees. The roll corresponds to the tilt of the motorbike in a plane transverse to the motorbike perpendicular to the track.

There therefore exists a requirement to propose a method for determining values of drift of tires of a vehicle, whatever the climatic conditions and the nature of the track.

The invention relates to a data processing method for determining drift values of at least one tire, the said tire belonging to a vehicle with at least two wheels comprising at least two GPS antennas and means for determining values of roll of the said vehicle. The method comprises, for various positions of the vehicle on a track, a step of determining coordinates of the GPS antennas, a step of determining values of roll of the vehicle, a step of determining various points of contact between the tire and the track on the basis of coordinates of at least one of the GPS antennas and of various values of roll of the vehicle, the said contact points forming a trajectory of the tire on the track. The processing method also comprises a step of determining a tangent to the trajectory of the tire at at least one contact point from among the said contact points, a step of determining, on the basis of coordinates of the GPS antennas, an orientation of a wheel plane associated with the tire and a step of determining a drift value on the basis of the tangent and of the orientation of the wheel plane.

The invention thus makes it possible to determine in a simple and effective manner the drift values of the front and/or rear tire of a motorbike.

To determine the coordinates of the various points of contact between the tire and the track, the invention proposes that at least two GPS (for "Global Positioning System") receivers be placed on the vehicle, each receiver comprising a GPS antenna. For each position of the motorbike on the track, it is thus possible to obtain the coordinates of the various GPS antennas. On the basis of these coordinates and of the knowledge of the roll value of the motorbike in the position in question, it is possible to obtain the coordinates of the contact point of the rear tire. It is possible to also obtain the coordinates of the contact point of the front tire by taking account also of a value of steer of the front wheel.

In a variant embodiment, the processing method comprises, for various positions of the vehicle on the track, a step of determining values of steer of the front wheel of the vehicle, and an orientation of a wheel plane associated with the front tire is determined as a function of one of the steer values and of a longitudinal direction of the vehicle determined on the basis of coordinates of the GPS antennas.

Another subject of the invention relates to a data processing device for determining drift values of at least one tire, the said tire belonging to a vehicle with at least two wheels comprising at least two GPS antennas, means for determining values of roll of the vehicle, means for determining coordinates of the GPS antennas for various positions of the vehicle on a track, means for determining various points of contact between the tire and the track on the basis of coordinates of at least one of the GPS antennas and of various values of roll of the vehicle, the said contact points forming a trajectory of the tire on the track, means for determining a tangent to the trajectory of the tire at the level of a contact point from among the said contact points, means for determining, on the basis of coordinates of the GPS antennas, an orientation of a wheel plane associated with the tire, means for determining a drift value on the basis of the tangent and of the orientation of the wheel plane.

In a variant embodiment, the first GPS antenna is aligned with the second GPS antenna in a longitudinal plane of the vehicle so that an axis passing through the first GPS antenna and the second GPS antenna defines a longitudinal direction of the vehicle.

In a variant embodiment, the first GPS antenna and the second GPS antenna are positioned at one and the same height on the vehicle.

The influence of pitching in determining the drift values is thus limited.

In a variant embodiment, the first GPS antenna and the second GPS antenna are positioned respectively at the front and at the rear of the vehicle and the distance between the first GPS antenna and the second GPS antenna is greater than or equal to a meter.

The longitudinal direction of the vehicle is thus determined more accurately.

In a variant embodiment, the GPS antennas and the means for determining coordinates are compatible with RTK technology.

The accuracy in the determination of the coordinates of the GPS antennas is thus improved.

In a variant embodiment, the GPS antennas are also able to pick up signals originating from satellites belonging to the locating system of GLONASS type and the means for determining coordinates are able to process the said signals.

It is thus ensured that the GPS antennas receive signals from a sufficient number of satellites to be able to determine the coordinates of the said antennas when the vehicle is travelling around the track.

Another subject of the invention relates to a computer program for processing data for determining drift values of at least one tire, the said tire belonging to a vehicle with at least two wheels comprising at least two GPS antennas and means for determining values of roll of the said vehicle, the said computer program comprising instructions for the implementation, for various positions of the vehicle on a track, of a step of determining coordinates of the GPS antennas, of a step of determining values of roll of the vehicle, of a step of determining various points of contact between the tire and the track on the basis of coordinates of at least one of the GPS antennas and of various values of roll of the vehicle, the said contact points forming a trajectory of the tire on the track. The computer program also comprises instructions for the implementation of a step of determining a tangent to the trajectory of the tire at at least one contact point from among the said contact points, of a step of determining, on the basis of coordinates of the GPS antennas, an orientation of a wheel plane associated with the tire and of a step of determining a drift value on the basis of the tangent and of the orientation of the wheel plane.

Other characteristics and advantages of the invention will emerge from the following description, given by way of example, without limiting character, with regard to the appended drawings in which.

In the present description, the invention is described in an application of selecting tires to improve the performance of a vehicle. However, it will be noted from the outset that the invention is not limited to this particular exemplary embodiment.

In the description which follows, substantially identical or similar elements will be designated by identical references.

Figure 1:
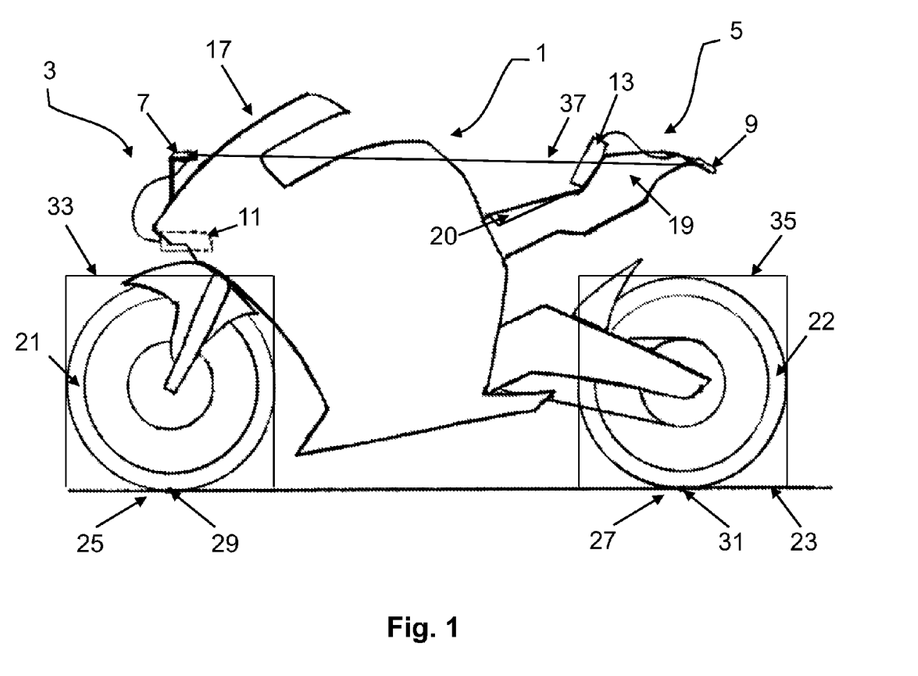
FIG. 1 schematically represents a side view of a motorbike comprising two GPS receivers.

FIG. 1 presents a schematic view of a vehicle, here a motorbike 1. The motorbike 1 comprises, here, a first GPS receiver 3 and a second GPS receiver 5. Of course, it is possible to equip the motorbike with a larger number of GPS receivers.

Each GPS receiver 3, 5 comprises a GPS antenna 7, 9 and means 11, 13 for determining coordinates of the GPS antennas at various instants.

The first GPS antenna 7 is positioned at the front of the vehicle at the level of a front shell 17. More precisely, the first GPS antenna 7 is positioned fore of the front shell 17 so that the disturbances in respect of the reception of GPS signals are limited.

The second GPS antenna 5 is positioned at the rear of the vehicle at the level of a rear shell 19 of the motorbike.

The motorbike 1 also comprises means for determining values of roll 20 of the vehicle. These determining means 20 are positioned, for example, under a seat of the driver.

The motorbike 1 comprises a front tire 21 and a rear tire 22. Each tire 21, 22 is in contact with a track 23 respectively at the level of a front contact area 25 and of a rear contact area 27. The front contact area 25 and the rear contact area 27 are substantially elliptical in shape.

For more effective processing of data, it is specified that the front tire 21 is in contact with the track 23 at the level of a front contact point 29 and the rear tire 22 is in contact with the track 23 at the level of a rear contact point 31. It is possible to specify, for example, that the front contact point 29 is the centre of the front contact area 25 or barycentre of the front contact area. The rear contact point 31 is the centre of the rear contact area 27 or barycentre of the rear contact area.

The motorbike 1 exhibits a front wheel plane 33 associated with the front tire 21 and a rear wheel plane 35 associated with the rear tire 22. As has already been specified, a wheel plane is a plane perpendicular to the axis of rotation of the wheel.

The second GPS antenna 9 is aligned with the first GPS antenna 7 in a longitudinal plane so that an axis passing through the first GPS antenna 7 and through the second GPS antenna 9 defines a longitudinal direction 37 of the vehicle.

It will be noted henceforth that the orientation of the rear wheel plane 35 is parallel to the longitudinal direction 37 of the vehicle.

In another embodiment, the first GPS antenna 7 and the second GPS antenna 9 are positioned at one and the same height on the vehicle.

In another embodiment, the distance between the first GPS antenna 7 and the second GPS antenna 9 is greater than or equal to a meter.

Figure 2:
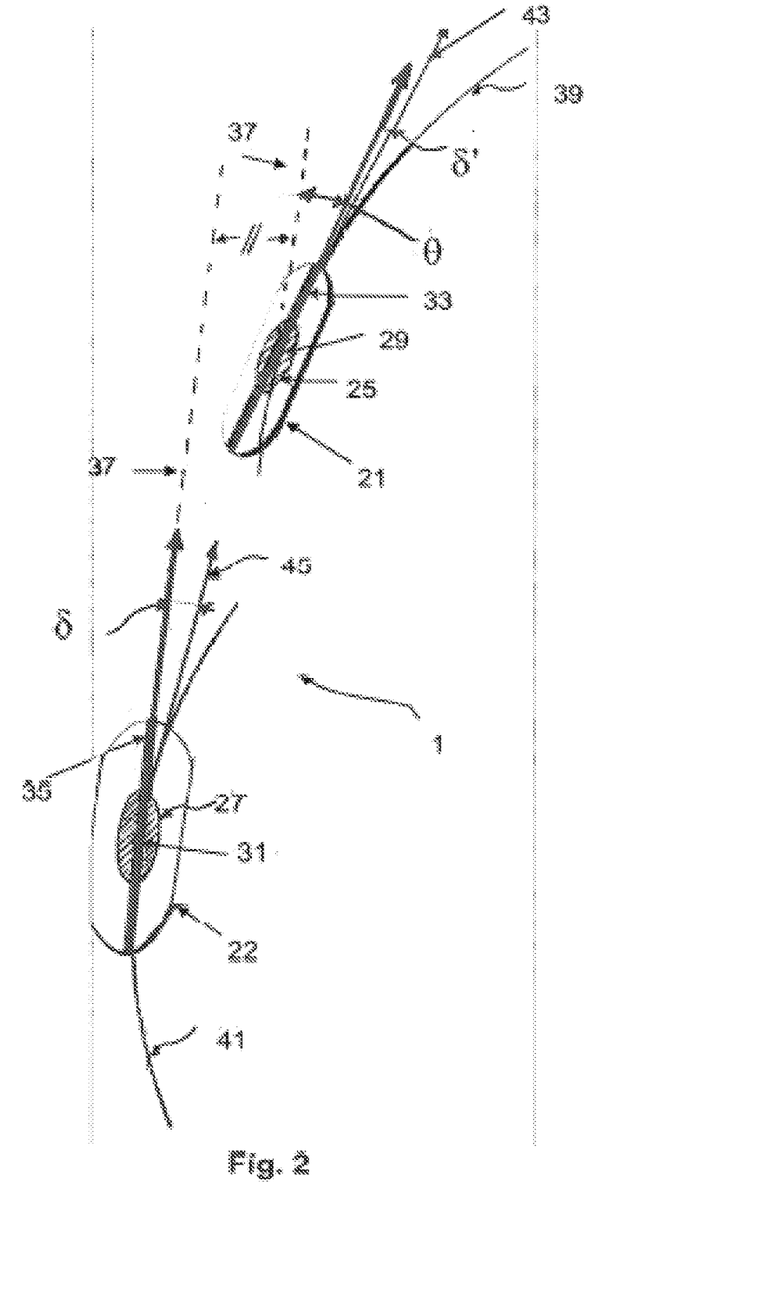
FIG. 2 schematically represents a view from above of the motorbike of FIG. 1.

FIG. 2 presents a view from above of the motorbike 1 during cornering where the driver steers the front wheel.

A front trajectory 39 is associated with the front tire 21. The front trajectory 39 is formed by the set of points of front contact 29 between the front tire 21 and the track.

It is thus possible to define a front tangent 43 to the front trajectory 39 at any front contact point.

In the same manner, a rear trajectory 41 is associated with the rear tire 22. The rear trajectory 41 is formed by the set of points of rear contact 31 between the rear tire 22 and the track.

It is also possible to define a rear tangent 45 to the rear trajectory 41 at any rear contact point.

It is thus noted that the front trajectory 43 is different from the rear trajectory 41 on account of certain characteristics of the motorbike such as the angle of rake and the ground offset.

A drift value of the rear tire 22 corresponds to the angle $\delta$ formed between the rear tangent 45 and the orientation of the rear wheel plane 35 (that is to say the longitudinal direction 37 of the vehicle) at the level of the rear contact point 31.

In the case of the front tire 21, the orientation of the front wheel plane 33 is shifted by an angle of steer $\theta$ with respect to the longitudinal direction 37. The angle of steer $\theta$ corresponds, here, to the projection on the ground of the rotation of the handlebars of the motorbike.

A drift value of the front tire 21 corresponds to the angle $\delta'$ formed between the front tangent 43 and the orientation of the front wheel plane 33 at the level of the front contact point.

Figure 3:
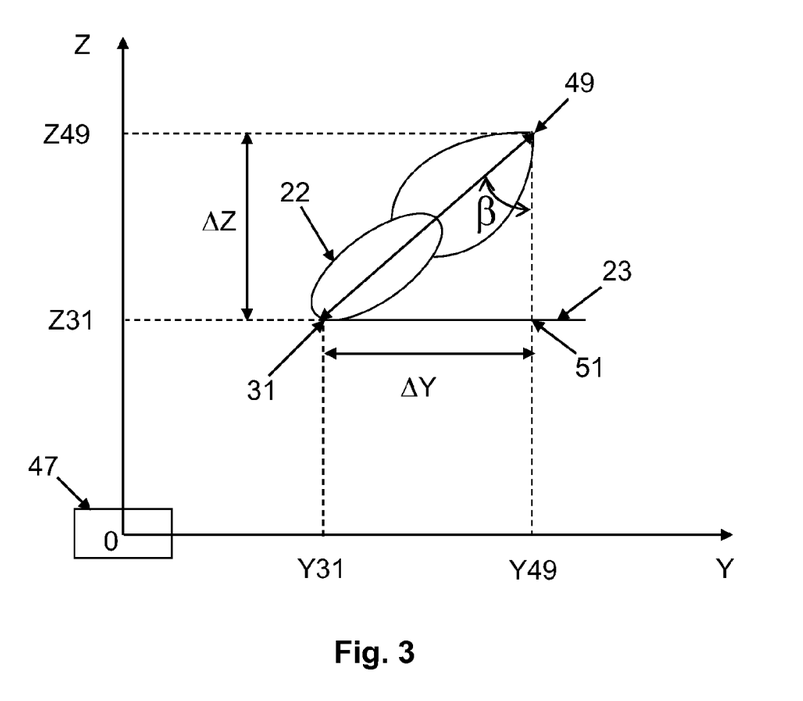
FIG. 3 schematically represents a rear view of the motorbike of FIG. 1 when the latter is tilted whilst cornering.

We shall now explain, on the basis of FIG. 3, how the coordinates of a rear contact point 31 are determined on the basis of the coordinates of a point 49 belonging to the second GPS antenna 9.

FIG. 3 presents a rear view of the motorbike 1, in a plane Y-Z, when the motorbike is tilted whilst cornering.

A third GPS receiver 47 fixed with respect to the track determines the origin point 0 of the Y-Z reference frame. The Y axis corresponds here to a horizontal axis and the Z axis corresponds to a vertical axis.

The rear contact point 31 is determined by a pair of coordinates {Y31, Z31} and the point 49 belonging to the second GPS antenna 9 is determined by a pair of coordinates {Y49, Z49}. A distance ΔY along the Y axis is defined between the rear contact point 31 and the point 49. A distance ΔZ along the Z axis is defined between the rear contact point 31 and the point 49.

The point 49 is for example the centre of the second GPS antenna 9.

The length L of the segment [31, 49] is a known geometric datum of the motorbike. In a first embodiment, the length L of the segment [31, 49] is fixed.

In a variant embodiment, the length L of the segment [31, 49] is variable depending on the position of the motorbike 1 on the track, the speed of the motorbike 1, etc. The length L can thus vary as a function of the play of a suspension (not represented) associated with the rear tire 22.

A point 51 corresponds to the projection of the point 49 on the track 23.

The motorbike 1 is here tilted by an angle of roll β. The angle of roll β is the angle formed between the segment [31, 49] and a segment [51, 49] vertical to the track 23.

It is thus possible to establish the following system of equations:

$$Y31 = Y49 - \Delta Y \text{ with } \Delta Y = \sin \beta * L$$

$$Z31 = Z49 - \Delta Z \text{ with } \Delta Z = \cos \beta * L$$

It is then possible to determine the coordinates of a rear contact point 31 on the basis of the coordinates of the point 49 belonging to the second GPS antenna, on the basis of the length L of the segment [31, 49] and on the basis of the angle of roll 3.

In the same manner, the coordinates of a front contact point will be determined on the basis of the coordinates of a point belonging to the first GPS antenna.

It is however entirely possible to determine the coordinates of the points of front and rear contact on the basis of the coordinates of a point belonging to one and the same GPS antenna (first GPS antenna or second GPS antenna).

Figure 4:
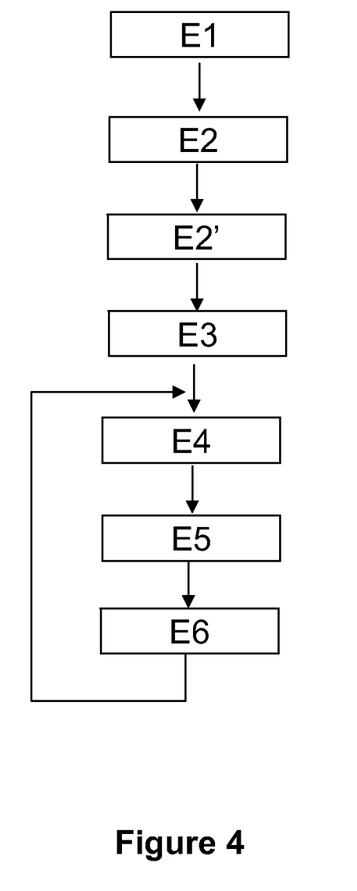
FIG. 4 represents a flowchart of the steps of a data processing method for determining drift values of a tire belonging to the motorbike of FIG. 1.

FIG. 4 represents a flowchart of the steps of a data processing method for determining drift values of a tire.

The data processing method comprises a step E1 of determining coordinates of the GPS antennas 7, 9 for various positions of the vehicle on the track. Determining coordinates of the GPS antennas 7, 9 is understood to mean that the method determines the particular coordinates of points belonging to the GPS antennas 7, 9, for example, the centres of the GPS antennas 7, 9.

The data processing method also comprises a step E2 of determining values of roll of the vehicle for the various positions of the vehicle on the track.

In a step E3, the method determines various points of front contact and various points of rear contact between the tire or tires 21, 22 and the track on the basis of the coordinates of the GPS antennas and various values of roll of the vehicle. As has already been specified, the various points of front contact form the front trajectory and the various points of rear contact form the rear trajectory.

The data processing method also comprises a step E4 of determining a tangent to the trajectory of a tire at the level of a contact point.

In a step E5, the method determines an orientation of a wheel plane associated with the tire on the basis of the coordinates of the GPS antennas.

In a step E6, the method determines a drift value on the basis of the tangent and of the orientation of the wheel plane.

It will be noted that it is possible to repeat steps E4 to E6 to determine various drift values.

It will also be noted that the data processing method is suitable for determining drift values of a front tire and/or of a rear tire. In the case of a front tire, it is necessary to provide for an additional step E2' of determining values of steer of the front wheel of the vehicle. The orientation of a wheel plane associated with the front tire is then determined as a function of one of the steer values and of a longitudinal direction of the vehicle.

Figure 5:
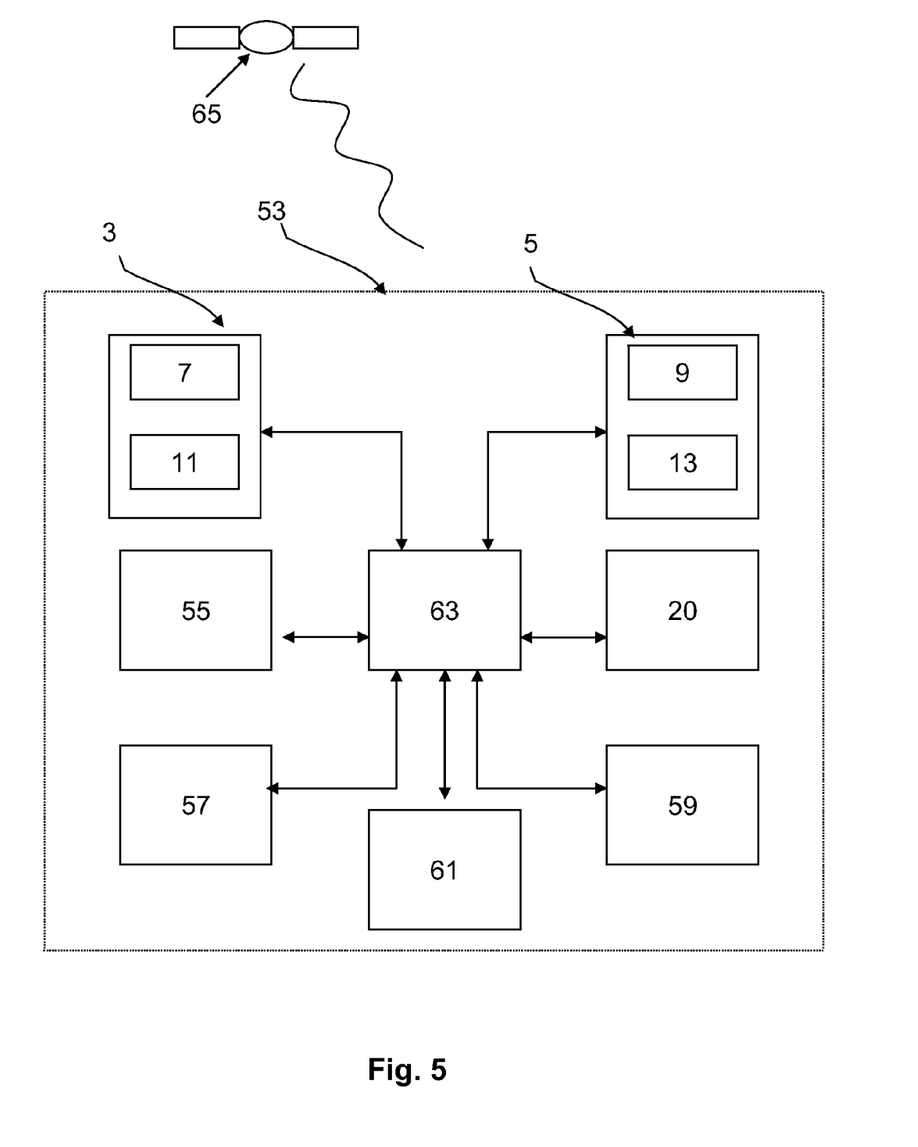
FIG. 5 represents a data processing device for the implementation of the processing method of FIG. 4.

We shall now describe, with reference to FIG. 5, a processing device 53 for determining drift values of a tire.

The processing device 53 here comprises:
  two GPS receivers 3, 5 comprising respectively GPS antennas 7, 9 and modules 11, 13 for determining coordinates of the GPS antennas;
  a module 20 for determining values of roll of the vehicle;
  a module 55 for determining various points of contact between the tire and the track;
  a module 57 for determining a tangent;
  a module 59 for determining an orientation of a wheel plane;
  a module 61 for determining a drift value;
  a control unit 63.

The GPS antennas 7, 9 are able to receive signals originating from satellites 65 belonging to a locating system of GPS type and the means 11, 13 for determining the coordinates are able to process the GPS signals received by the said GPS antennas 7, 9.

In a variant embodiment, the GPS receivers 3, 5 are also able to receive signals originating from satellites belonging to a locating system of GLONASS type. It is thus ensured that the GPS receivers 3, 5 receive signals from a sufficient number of satellites for the means 11, 13 for determining the coordinates to be able to determine the coordinates of the said GPS antennas 7, 9.

In a variant embodiment, the GPS receivers 3, 5 are compatible with RTK (for "Real Time Kinematic") technology. It is possible, by virtue of this technology, to determine the coordinates of the antennas with an accuracy of the order of a centimeter.

The module 20 for determining values of roll of the vehicle is able to determine values of roll of the vehicle. The module 20 takes, for example, the form of lasers or the form of an inertial platform.

The module 55 for determining various contact points is able to determine contact points on the basis of coordinates of the GPS antennas and various roll values.

The module 57 for determining a tangent is able to determine a tangent to the trajectory of a tire at the level of a contact point.

The module 59 for determining an orientation of a wheel plane is able to determine the orientation of a wheel plane associated with a tire.

The module 61 for determining a drift value is able to determine the value of a drift on the basis of a tangent to the trajectory of a tire and of an orientation of a wheel plane associated with the said tire.

The control unit 63 is connected to the GPS receivers 3, 5, to the module 20 for determining values of roll of the vehicle, to the module 55 for determining various contact points, to the module 57 for determining a tangent, to the module 59 for determining an orientation of a wheel plane, to the module 61 for determining a drift value.

The role of the control unit 63 is to control the operation of the GPS antennas 7, 9 and of the various modules 11, 13, 55, 57, 59, 61.

In the example described here, the modules 11, 13, 55, 57, 59, 61 are software means. The invention therefore also relates to a computer program comprising instructions for the implementation of the previously described data processing method, implemented by the data processing device 53 when the program is executed by a processor present in the control unit 63. This program may be stored in or transmitted by an information medium. The latter may be a hardware storage medium, for example a CD-ROM, a magnetic diskette or a hard disk, or else a transmissible medium such as an electrical, optical or radio signal.

The invention claimed is:

1. A data processing method for determining a drift value $\delta$ of at least one rear tire, a drift value $\delta'$ of at least one front tire, or both $\delta$ and $\delta'$, the front or rear tire belonging to a vehicle comprising at least two wheels, the vehicle comprising at least two GPS antennas and a roll value determining module for determining values of roll ($\beta$) of the vehicle, the method comprising:
   for various positions of the vehicle on a track:
      determining coordinates of the GPS antennas by a coordinate determining module;
      determining values of roll ($\beta$) of the vehicle by a roll value determining module;
      determining various points of contact between the tire and the track on the basis of coordinates of at least one of the GPS antennas and of various roll values, the said contact points forming a trajectory of the tire on the track by a point of contact determining module;
   at at least one point of contact from among said various points of contact:
      determining a tangent to the trajectory of the tire at the level of the said contact point by a tangent determining module;
      determining an orientation of a wheel plane associated with the tire on the basis of coordinates of the GPS antennas by a wheel plane orientation determining module;
      determining the drift value ($\delta$ or $\delta'$ or both) on the basis of the angle between the tangent and the orientation of the wheel plane by a drift value determining module.

2. The data processing method according to claim 1, further comprising, for various positions of the vehicle on the track, determining values of steer of the front wheel of the vehicle, determining an orientation of a wheel plane associated with the front tire as a function of one of the steer values, and determining a longitudinal direction of the vehicle on the basis of coordinates of the GPS antennas.

3. A data processing device for determining a drift value $\delta$ of at least one rear tire, a drift value $\delta'$ of at least one front tire, or both $\delta$ and $\delta'$, the front or rear tire belonging to a vehicle with at least two wheels comprising:
   at least two GPS antennas;
   a coordinate determining module for determining coordinates of the GPS antennas for various positions of the vehicle on a track;
   a roll value determining module for determining roll values for the various positions of the vehicle on the track;
   a point of contact determining module for determining various points of contact between the tire and the track on the basis of coordinates of at least one of the GPS antennas and of various roll values ($\beta$), the said contact points forming a trajectory of the tire on the track;
   a tangent determining module for determining a tangent to the trajectory of the tire at the level of a contact point from among the said contact points;
   a wheel plane orientation determining module for determining, on the basis of coordinates of the GPS antennas, an orientation of a wheel plane associated with the tire, at the said contact point;
   a drift value determining module for determining a drift value ($\delta$ or $\delta'$ or both) on the basis of the angle between the tangent and of the orientation of the wheel plane.

4. The data processing device according to claim 3 in which a first GPS antenna is aligned with a second GPS antenna in a longitudinal plane of the vehicle so that an axis passing through the first GPS antenna and the second GPS antenna defines a longitudinal direction of the vehicle.

5. The data processing device according to claim 3, in which the first GPS antenna and the second GPS antenna are positioned at one and the same height on the vehicle.

6. The data processing device according to any claim 3, in which the first GPS antenna and the second GPS antenna are positioned respectively at the front and at the rear of the vehicle and the distance between the first GPS antenna and the second GPS antenna is greater than or equal to a meter.

7. The data processing device according to claim 3, in which the GPS antennas and the means for determining coordinates are compatible with RTK technology.

8. The data processing device according to claim 3, in which the GPS antennas are also able to receive signals originating from satellites belonging to a locating system of GLONASS type and the coordinate determining module is able to process the said signals.

9. A non-transitory computer readable medium comprising a computer program for processing data for determining a drift value $\delta$ of at least one rear tire, a drift value $\delta'$ of at least one front tire, or both $\delta$ and $\delta'$, the front or rear tire belonging to a vehicle comprising at least two wheels, the said vehicle comprising at least two GPS antennas and roll value determining module for determining values of roll ($\beta$) of said vehicle, said computer program comprising instructions for the implementation of the steps of:
   for various positions of the vehicle on the track:
      determining coordinates of the GPS antennas;
      determining roll values ($\beta$);
      determining various points of contact between the tire and the track on the basis of coordinates of at least one of the GPS antennas and of various roll values ($\beta$), the said contact points:
   at at least one contact point from among the said contact points:
      determining a tangent to the trajectory of the tire at the level of the said contact point;
      determining, on the basis of coordinates of the GPS antennas, an orientation of a wheel plane associated with the tire;

determining a drift value on the basis of the angle between the tangent and of the orientation of the wheel plane.

* * * * *